United States Patent
Rochford et al.

(10) Patent No.: US 10,241,946 B2
(45) Date of Patent: Mar. 26, 2019

(54) MULTI-CHANNEL DMA SYSTEM WITH COMMAND QUEUE STRUCTURE SUPPORTING THREE DMA MODES

(71) Applicant: NXP USA, Inc., Austin, TX (US)

(72) Inventors: Michael J. Rochford, Round Rock, TX (US); Rabindra Guha, Stittsville (CA); Daniel C. Laroche, Kemptville (CA); Malcolm D. Stewart, Ottawa (CA)

(73) Assignee: NXP USA, Inc., Austin, TX (US)

( * ) Notice: Subject to any disclaimer, the term of this patent is extended or adjusted under 35 U.S.C. 154(b) by 197 days.

(21) Appl. No.: 15/408,908

(22) Filed: Jan. 18, 2017

(65) Prior Publication Data

US 2018/0203815 A1    Jul. 19, 2018

(51) Int. Cl.
| | | |
|---|---|---|
| G06F 13/10 | (2006.01) | |
| G06F 13/28 | (2006.01) | |
| G06F 13/16 | (2006.01) | |
| G06F 5/06  | (2006.01) | |

(52) U.S. Cl.
CPC .............. *G06F 13/28* (2013.01); *G06F 5/065* (2013.01); *G06F 13/1673* (2013.01)

(58) Field of Classification Search
None
See application file for complete search history.

(56) References Cited

U.S. PATENT DOCUMENTS

| | | | | |
|---|---|---|---|---|
| 5,640,399 A | * | 6/1997 | Rostoker | ............. H04L 12/4625 370/392 |
| 5,781,799 A | * | 7/1998 | Leger | ...................... G06F 13/28 710/22 |
| 5,828,856 A | * | 10/1998 | Bowes | ..................... G06F 13/28 710/308 |
| 5,875,352 A | * | 2/1999 | Gentry | .................. G06F 12/123 710/22 |
| 6,055,579 A | | 4/2000 | Goyal et al. | |
| 6,941,390 B2 | | 9/2005 | Odom | |

(Continued)

OTHER PUBLICATIONS

Sebastian Hessel et al., Architectural Analysis of a Smart DMA Controller for Protocol Stack Acceleration in LTE Terminals, Vehicular Technology Conference Fall (VTC 2010—Fall), 2010 IEEE 72nd, Sep. 6-9, 2010.

(Continued)

*Primary Examiner* — Cheng Yuan Tseng (57) ABSTRACT

A method, system, and apparatus are provided for managing multiple DMA channels in different DMA modes by processing command sequences associated with different virtual DMA channels and stored in a command queue structure, such that a first command sequence is processed to directly configure one or more first register descriptors at a context store to implement a direct configuration DMA mode for a first virtual channel, a second command sequence is processed to initiate a fetch of a linked list descriptor chain for loading one or more second register descriptors at a second DMA channel context store register to implement a link list configuration DMA mode for a second virtual channel, and a third command sequence is processed to retrieve an instruction program for loading into the command queue structure and execution by the DMA controller to implement a program configuration DMA mode for a third virtual channel.

19 Claims, 4 Drawing Sheets

(56) References Cited

U.S. PATENT DOCUMENTS

| | | | |
|---|---|---|---|
| 7,133,940 B2 | 11/2006 | Blightman et al. | |
| 7,302,503 B2 | 11/2007 | MacInnis | |
| 7,565,462 B2 | 7/2009 | MacInnis | |
| 7,716,389 B1* | 5/2010 | Bruce | G06F 13/28 370/338 |
| 7,822,885 B2 | 10/2010 | Bouvier | |
| 8,108,571 B1 | 1/2012 | Bouvier | |
| 8,601,169 B1* | 12/2013 | Paragaonkar | G06F 3/0613 710/52 |
| 8,804,752 B2* | 8/2014 | Manula | H04L 49/358 370/412 |
| 9,047,264 B2* | 6/2015 | Kanigicherla | G06F 13/28 |
| 2006/0248240 A1* | 11/2006 | Ishii | G06F 13/28 710/22 |
| 2008/0133786 A1 | 6/2008 | MacInnis | |
| 2008/0198170 A1 | 8/2008 | Gua | |
| 2009/0100200 A1 | 4/2009 | Bouvier | |
| 2009/0282172 A1 | 11/2009 | MacInnis | |
| 2009/0287857 A1 | 11/2009 | Vu | |
| 2010/0161848 A1 | 6/2010 | Flachs et al. | |
| 2013/0282933 A1 | 10/2013 | Jokinen et al. | |
| 2014/0006748 A1 | 1/2014 | Stewart et al. | |
| 2014/0317333 A1 | 10/2014 | Dorst et al. | |
| 2014/0344488 A1* | 11/2014 | Flynn | G06F 5/14 710/52 |
| 2015/0169494 A1 | 6/2015 | Robertson et al. | |
| 2016/0011996 A1* | 1/2016 | Asaad | G06F 15/76 710/308 |

OTHER PUBLICATIONS

Mark Langsdorf, AMD, Using the SmartDMA Controller with USB on the Am186 CC Controller, Application Note Publication # 23112, Rev: A, Amendment/0, Nov. 1999.

Ross Mitchell, NXP Freescale Semiconductor, Tutorial: Introducing the XGATE Module to Consumer and Industrial Application Developers, AN 3224, Rev. 0, Mar. 2006.

Martin Vaupel et al., NXP Freescale Semiconductor, MPC57xx: Configuring and Using the eDMA Controller, AN 4765, Rev. 1, Aug. 2013.

NXP Freescale, eDMA for Kinetis K Series MCUs, Enhanced Direct Memory Access Controller (eDMA) and DMA Multiplexer (DMAMUX), Rev. 1.0, 2015.

nxp.com, Quad Core 16-bit Digital Signal Processor, Overview(/pages/quad-core-16-bit-digital-signal-processor:MSC8102), printed Jan. 18, 2017.

* cited by examiner

MULTI-CHANNEL DMA SYSTEM WITH COMMAND QUEUE STRUCTURE SUPPORTING THREE DMA MODES

BACKGROUND OF THE INVENTION

Field of the Invention

The present invention is directed in general to field of data processing systems. In one aspect, the present invention relates generally to a method and apparatus for direct memory access operations in a data processing system.

Description of the Related Art

A data processing system can employ a direct memory access (DMA) controller to relieve processor cores from the burden of managing data transfers. In response to data transfer requests from the processor cores, the DMA controller provides the requisite control information to the corresponding source and destination so that the data transfer requests are satisfied. Because the DMA controller handles the formation and communication of the control information, the processor cores are freed to perform other tasks while awaiting satisfaction of the data transfer requests. As typically implemented, DMA controllers may include one or more specialized auxiliary processor(s) that transfer data between locations in memory and/or peripheral input/output (I/O) devices and memory without intervention of the processor core(s) or CPUs. In addition, multiple DMA channels corresponding to particular DMA transfers or devices are typically supported by having a processor initiate a DMA-mediated transfer (e.g., by setting values in DMA registers to specify, for a particular DMA channel, source and destination addresses as well as a counter to control the number of units of data to be transferred) and then having a corresponding one of the auxiliary processor handle the DMA transfer. In some existing systems, the auxiliary processor is embodied as a multi-channel DMA (MCDMA) controller and once the DMA transfer is completed, or if the DMA channel must yield a higher priority DMA access, the MCDMA controller either automatically performs the DMA channel switch or interrupts the CPU to indirectly initiate such a switch. In other systems, auxiliary processor support for DMA operations may be distributed, e.g., amongst peripheral I/O devices. In yet other systems, auxiliary processor support is centralized but dedicated to particular transfers (e.g., as a DMA engine for each peripheral I/O device), in which case some facility, such as a DMA bus, is required for arbitrating among auxiliary processors for use of shared resources. In other systems, a single auxiliary processor or DMA engine is provided and shared amongst all the competing DMA channels and pending DMA transfers, in which case a context switch from one DMA channel to the next loads the auxiliary process with parameters for a next active DMA channel/transfer, while saving parameters for the previous DMA channel/transfer.

As next-generation system-on-chip (SOC) devices increasingly push latency and data throughput design requirements, demands on DMA facilities tend to increase as well. Unfortunately, in many of these types of designs, form-factor, part count, power budgets, and conflicting data transfer protocols can all impose significant constraints. Therefore, mere replication of auxiliary processor support may not be a winning design strategy. On the other hand, context switching overheads often associating with multiplexing use of a single auxiliary processor resource can adversely affect DMA transfer latencies and ultimately the user experience. As seen from the foregoing, the existing solutions for managing multi-channel DMA operations are extremely difficult at a practical level by virtue of the difficulty balancing design constraints typical of portable and/or handheld devices (including form-factor, part count, protocol compatibility, and power budget constraints) with performance demands.

BRIEF DESCRIPTION OF THE DRAWINGS

The present invention may be understood, and its numerous objects, features and advantages obtained, when the following detailed description of a preferred embodiment is considered in conjunction with the following drawings.

DETAILED DESCRIPTION

A system, apparatus, and methodology are described for employing a multi-channel direct memory access controller to offload CPU and host processor work using multiple command queue structures for storing a sequence of commands to support DMA operations in three different DMA modes, thereby creating more software flexibility, increasing system performance, and maintaining backward compatibility. In selected embodiments, the disclosed multi-channel DMA system uses a command queue structure to support three different modes of DMA operation. In a first "direct configuration" mode, the DMA channel context registers are configured directly. In a second "link list configuration" mode, a sequence of commands may be written directly into the command queue structure for initiating a fetch of a linked list descriptor chain for loading into the context registers. Finally, the third "program configuration" mode may be used to fetch an instruction program from memory for loading into the command queue by using a DMA engine. By supporting dynamic assignment of program sequences (Virtual Channel) to the command queue structures and also supporting the dynamic assignment of command queue structures to contexts (Physical Channels), all three modes can operate simultaneously, even when a different mode is configured for each channel. In disclosing the claimed apparatus, system, and method for supporting multiple DMA modes by using specific rules, rather than humans, to write a sequence of commands directly into a command queue structure, there is disclosed an improvement in computer-related technology for improving the performance of a data processing system.

Figure 1:
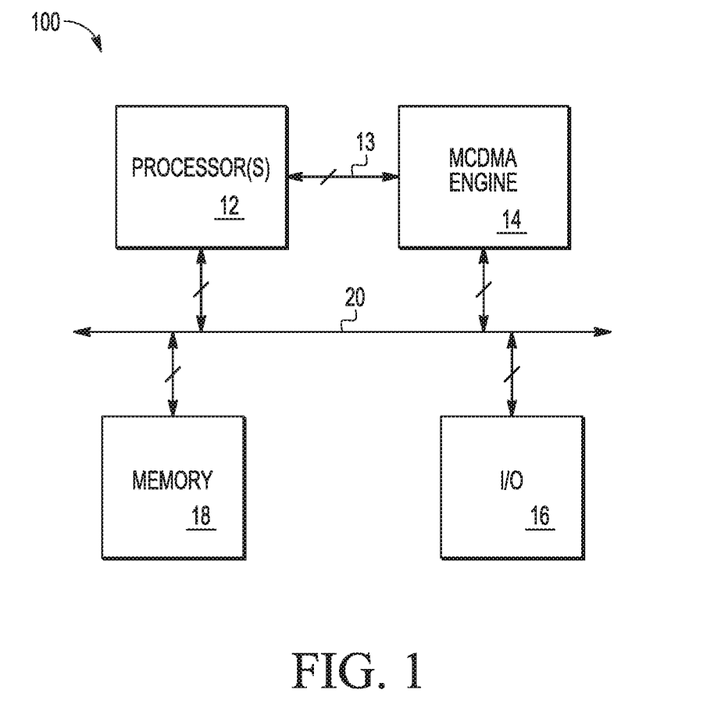
FIG. 1 is a simplified block diagram of a data processing system in accordance with selected embodiments of the present disclosure.

To provide a contextual understanding for selected embodiments of the present disclosure, reference is now made to FIG. 1 which shows a simplified block diagram of a data processing system 100 in accordance with selected embodiments of the present disclosure. In general, data processing system 10 may be implemented on a single integrated circuit or on a plurality of integrated circuits. In some cases, data processing system 10 may be implemented as a system-on-chip. In the illustrated configuration, the data processing system 10 includes one or more processors 12, a multi-channel direct memory access (MCDMA) engine or controller 14, I/O devices 16, and memory 18. Components of data processing system 10 are interconnected and interoperate using any suitable techniques. For simplicity, interconnection amongst major functional blocks is illustrated using bus 20, although persons of ordinary skill in the art will recognize that any of a variety of interconnection techniques and topologies may be employed without departing from the present disclosure. DMA requests, interrupts, completion signals and other coordination indications or status are communicated between processor(s) 12 and MCDMA engine 14 via any suitable interconnection, shown collectively as interconnect(s) 13. In general, the MCDMA engine 14 may be implemented on the same integrated circuit chip as processor(s) 12 or may be implemented as a separate integrated circuit or module.

Typically, implementations of processor(s) 12 include a fetch buffer for storing instructions to be executed by the processor(s), decoder and sequencing logic, one or more execution units, and register storage, together with suitable data, instruction and control paths. At any given time, consistent with a computation performed by processor(s) 12, units of program code (e.g., instructions) and data reside in memory 18, in one or more levels of cache(s) and/or in processor stores (such as a fetch buffer, registers, etc.). At least some of that program code may initiate DMA transfers as described in greater detail below. In general, any of a variety of memory hierarchies may be employed, including designs that separate or commingle instructions and data in memory or cache. Memory 18 (or any portion thereof) may be located on the same integrated circuit as a processor, may be located on a different integrated circuit than processor(s) 12 or may span multiple integrated circuits. In some designs, memory 18 may be shared by multiple processors. In addition, memory 18 may include storage of any suitable type, such as, for example, read only memory (ROM), random access memory (RAM), non-volatile memory (e.g., Flash), etc.

Although it is important to emphasize that memory 18 may have a somewhat hierarchical or distributed character in some embodiments, for clarity and focus, the disclosure that follows tends to ignore the potentially hierarchical nature of storage and possibility of shared and/or distributed memory configurations. Instead, the description focuses illustratively on DMA transfers to and/or from memory without regard to any distribution of underlying storage, caching mechanisms or coherence protocols that may be implemented in any particular embodiment. In this regard, persons of ordinary skill in the art will appreciate that any of a variety of memory models and suitable cache- and/or coherence-aware techniques may be employed, if desired, without departing from the spirit and scope of the present disclosure.

Though not specifically shown in FIG. 1, the MCDMA engine 14 may include one or more DMA engines that transfer data between locations in memory 18 and/or between input/output (I/O) devices 16 and memory 18 without intervention of processor(s) 12. Thus, the MCDMA engine 14 is configured to act (in furtherance of at least some DMA transfers) as a master on bus 20. As described in greater detail below, the MCDMA engine 14 uses a plurality of command queue FIFO structures to support multiple virtual DMA channels in different modes of operation by dynamically assigning program sequences (virtual channels) to command queues and dynamic assigning command queues to contexts (physical channels). In general, each individual virtual DMA channel corresponds to a particular DMA transfer or device (e.g., to a DMA transfer between one of I/O devices 16 and memory 18, to a scatter-gather DMA transfer between one set of locations in memory 18 and another, etc.). In operation, a processor 12 may initiate a first DMA transfer in a first direct configuration mode by directly setting values in DMA channel context registers to specify, for a particular virtual DMA channel, source and destination addresses, a byte count, etc. In addition, a processor 12 may initiate a second DMA transfer in a second link list configuration mode by directly writing a sequence of commands into one or more command queue FIFO structures to support the fetch of memory mapped link list descriptor chains that will be used to update the context store descriptors. In addition, a processor 12 may initiate a third DMA transfer in a third program configuration mode where an instruction program is fetched from memory and loaded into one or more command queue FIFO structures to support the fetch of a memory mapped instruction sequence.

Figure 2:
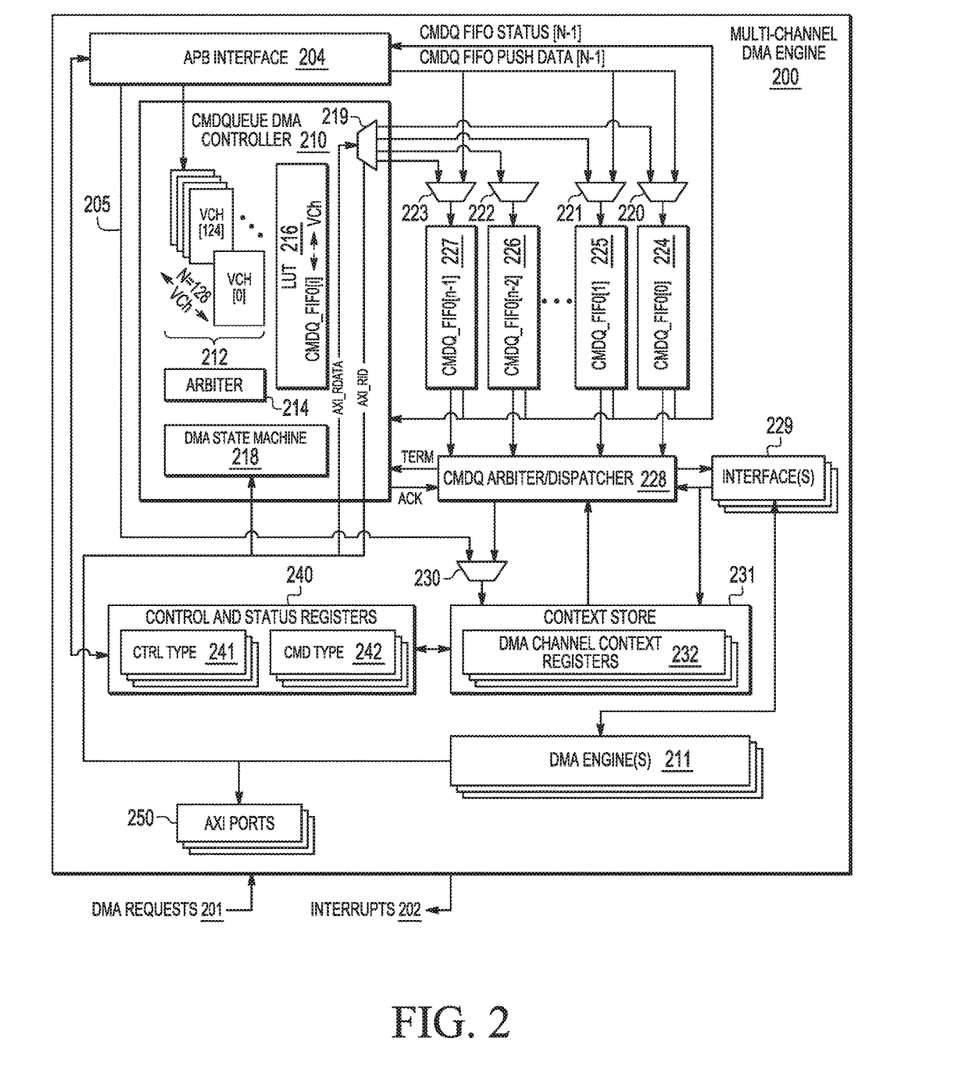
FIG. 2 is a simplified architectural block diagram of a multi-channel direct memory access hardware engine in accordance with selected embodiments of the present disclosure.

Referring now to FIG. 2, there is shown a simplified architectural block diagram 200 of a multi-channel direct memory access (MCDMA) hardware engine instance in accordance with selected embodiments of the present disclosure. In general, the MCDMA controller 200 is responsive to DMA requests 201 from processors or other masters and typically supplies interrupts 202, completion signals and other synchronization indications or status to such processors and masters. In the depicted MCDMA hardware engine 200, an APB interface 204 (or other appropriate bus interface, such as AXI, ACP, AMBA, etc.) is provided to access memory mapped registers/space within a Command Queue DMA controller 210 and associated command queue structures 224-227 (e.g., CMDQ_FIFO registers). In addition, multiple AXI ports 250 are provided to enable concurrent/high-bandwidth data movement to and from the Command Queue DMA controller 210 via a MUX/crossbar interconnect and/or bus (not shown).

As described more fully hereinbelow, the DMA controller 210 supports a plurality of simultaneous DMA transfer modes using multiple (e.g., 128) virtual DMA channels 212 which are mapped to communicate over multiple (e.g., 16) physical DMA channels. To this end, the DMA controller 210 may include 128 memory mapped registers 212, each including a source address or virtual channel address pointer, transmit size, and loop count. A round robin arbiter 214 selects which virtual channel to process, with the number of virtual channels that can be processed concurrently depending on the pool of command queue structures 224-227 (e.g., CMDQ_FIFO registers) allocated to the Command Queue DMA Controller 210. The DMA controller 210 may also include a lookup-table 216 for accessing the available command queue structures 224-227 by associating each VirtualChannel ID (e.g., SEQ_ID[6:0]) to a corresponding CMDQFIFO_ID. Once a CMDQ_FIFO is associated to a VirtualChannel DMA, the DMA controller 210 uses a DMA state machine 218 to fetch command data via the AXI ports 250 which return data AXI_RDATA using the AXI_RID[3:0] to route the data to the correct CMDQ_FIFO 224-227 which may be used to store a sequence of commands and/or instruction programs enabling the MCDMA engine 200 to fetch descriptors from memory using the command arbitration and dispatch module 228.

In selected embodiments, the command queue structures 224-227 may be implemented with a plurality of FIFOs which are connected via steering logic or multiplex circuitry 220-223 to receive data from the APB interface 204 or the CMDQDMA Controller 210. As will be appreciated, the FIFOs can be sized for different optimization of area and performance, such as by implementing the FIFOs with 16 CMD_QFIFOs, each FIFO being 128-bit wide by 32 deep, though other FIFO size configurations may be used. In addition, software controlled inputs to the steering/multiplex circuitry 220-223 are used to enable each CMDQFIFO to be masked as a resource for the CMDQDMA Controller 210 to insert commands into selected CMDQFIFOs, while the other CMDQFIFOs are manually driven by the APB Interface 204. In addition, each CMDQ_FIFO 224-227 may include a cache-like read port for enabling the Dispatcher 228 to index into the FIFO and read commands stored therein.

The MCDMA engine 200 also includes a command dispatcher 228 which arbitrates services for each of the command queue structures 224-227 in a round robin fashion to dispatch commands from each command queue structure 224-227 to its respective hardware. For example, depending upon the commands stored in a CMDQ_FIFO (e.g., 224), the command dispatcher 228 may be connected to update the DMA channel context registers 232 in the context store 231. In addition, the command dispatcher 228 may be connected to interact through the interface 229 with one or more submodules, such as the DMA engine(s) 211 and/or a sequencer or other peripheral devices (not shown). For example, the command dispatcher 228 may be connected to a Link List DMA engine which will fetch the descriptor to load into context registers 231). If the dispatcher 228 encounters a "WAIT" command from a CMDQ_FIFO, the dispatcher 228 may be configured to flag the CMDQFIFO (with SEQ_ID) as "unavailable" for further arbitration, while an "EXECUTE" signal received from a sequencer over the interface 229, with appropriate SEQ_ID, will clear the flag. An "EXECUTE" signal with a SEQ_ID not issues from the DMA engine is ignored since the "EXECUTE" signaling is a broadcast signal protocol. And if the dispatcher 228 encounters an "EXECUTE" command for a particular SEQ_ID from a CMDQ_FIFO, the dispatcher 228 may be configured to allocate a Global Context in the context store 231 to the SEQ_ID. If a global context is unavailable, the dispatcher 228 continues to the next CMDQFIFO. And if the CMDQFIFO is in a cache mode (e.g., where an entire instruction set fits the CMDQFIFO), the dispatcher 228 may be configured to access each CMDQFIFO 224-227 as a cache. This implies a unique "Program Counter" for each CMDQFIFO. Thus, when a JUMP command is observed, the dispatcher 228 re-adjusts the "Program Counter" and thus the pointer to the command in the CMDQFIFO.

The MCDMA engine 200 also includes a context store 231 which stores DMA channel context registers 232 which may be configured with transfer descriptors which indicate a source, a destination, and a number of data segments to be transferred from the source to the destination for each DMA channel. For example, the context store 231 may include a plurality of context store elements (e.g., 10 35×32-bit registers) which are provided for the hardware, where one or more of the elements may be memory mapped to the APB interface 204 to enable initialization and to act as a static cache. In selected embodiments, each context element in the context store 231 may be accessible from all the different submodules (e.g., DMA engine(s) 211, interface 229, dispatcher 228, etc.) for read/write operations so that the status of each context (Virtual Channel) is managed in the context store 231 where all sub-modules will be able to query these status(s) and be able to operate accordingly and independently.

In operation of the disclosed MCDMA engine 200, one or more DMA controllers 210 and an n-channel configuration context store 231 are used to manage a set of multiple virtual DMA channels (VDCs) for setting up data transfers in three different modes or levels by directly writing the channel context registers 232 in the context store 231 and/or by using instruction-like commands stored in the command queue structures 224-227 to indirectly write to the channel context registers 232. In selected embodiments, the lowest level (mode 0) of the three level structure directly configures the channel context registers 232 in the context store 231, such as by using the APB interface 204 to directly write DMA transfer details 205 (e.g., like source/destination address or port, number of bytes to transfer, etc.) via steering logic or multiplex circuitry 230. In addition, a second level (mode 1) of the three level structure uses the APB interface 204 to directly write a sequence of commands into the command queue structures 224-227 (e.g., CMDQ_FIFOs) based on a memory mapped address, and then using a dispatcher 228 to decode and process the sequence of commands stored in the command queue structures to configure a DMA fetch of memory-mapped link list descriptor chains for loading into the DMA channel context registers 232. In addition, the command queue DMA controller 210 is configured to support a highest level (mode 2) of configuration by programming the command queue DMA controller 210 with a "virtual" channel ID and fetch address for a command sequence stored in memory so that, once a command queue structure (e.g., CMDQ_FIFO[1] 225) is available, the DMA controller 210 starts the command sequence fetch and loads it into the available command queue structure. In this way, the commands may be drained from the command queue structure, resulting in a linked list descriptor being fetched from memory and loaded into the channel context registers 232.

By providing for arbitrated access to the command queue structures 224-227, the MCDMA hardware engine 200 allows a number of channels to run at the same time in different modes, including a "direct configuration" mode (mode 0), a "link list configuration" mode (mode 1), and a "program configuration" mode (mode 2). In selected embodiments, the multi-mode operation is controlled by storing DMA context enable values for each physical DMA channel in one or more control type registers 241 and/or command type registers 242 which may be stored in the control and status registers 240 (as shown) or in the context store 231 (not shown). Using control and command status bits in the registers 240-242, the mode is controlled by allowing a context register 232 to be available for update by the command queue dispatcher 228 at level 0, and by making a command queue structure 224-227 (e.g., CMDQ_FIFO[0]-[n−1]) available for update by the CMDQDMA controller 210. For example, operation of a DMA channel at the lowest level (mode 0) is controlled by resetting a DMA context value (e.g., Context[N]) in the control type register 241 for the DMA channel (e.g., Context[N]=0), indicating that the context registers 232 are not available for access by the command queue dispatcher 228. However, if the DMA context value (e.g., Context[N]) is set in the control type register 241 for the DMA channel (e.g., Context[N]=1), then this indicates that the operation of the DMA channel will be either Mode 1 or Mode 2. To differentiate between these modes, the operation of the DMA channel at the second level (mode 1) may be controlled by resetting a DMA command queue value (e.g., Command_Q[N]) in the control type register 241 for the DMA channel (e.g., Command_Q[N]=0), indicating that the context registers 232 are available for access by the command queue dispatcher 228 but are not available for access by the command fetch DMA. By the same token, the operation of the DMA channel at the highest level (mode 2) may be controlled by setting the DMA command queue value (e.g., Command_Q[N]) in the control type register 241 for the DMA channel (e.g., Command_Q[N]=1), indicating that the command queue FIFOs 224 are available for access by the command fetch DMA. For example, if there are 16 total contexts stored in the context store 231, 6 could be configured in mode 2, 6 could be configured in mode 1, and 4 could be configured in mode 0.

To further facilitate DMA operations, the MCDMA hardware engine 200 may include one or more dedicated DMA engines 211, including a LinkList DMA engine (which executes a DMA fetch of Link List descriptor data and stores it to the appropriate element in the context store 231), a Sideband DMA engine (which executes a DMA fetch of sideband data and stores it into a sideband storage element), and/or a NDDMA engine (which arbitrates all physical channel contexts in "ALLOCATED" state).

Figure 3:
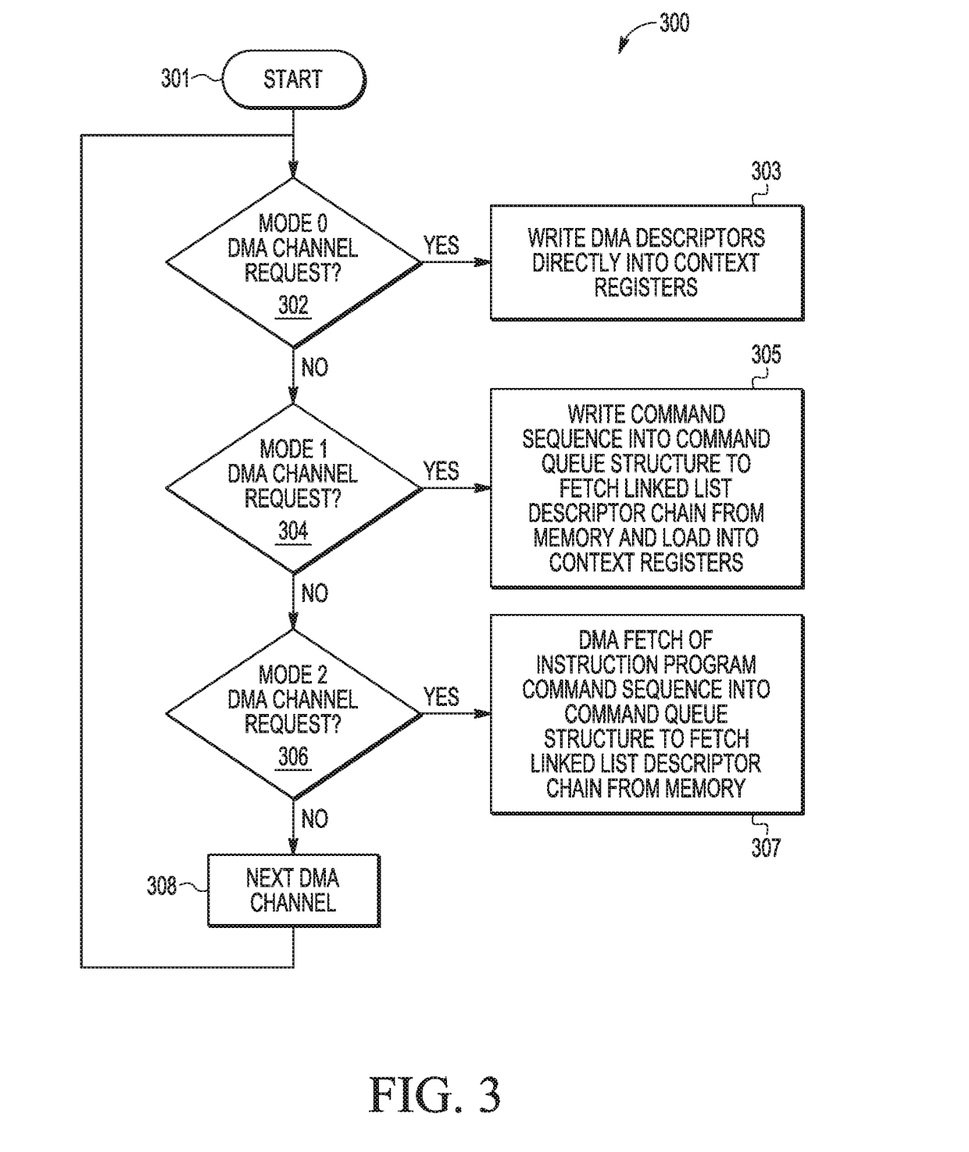
FIG. 3 illustrates a simplified flow chart showing the logic for using a command queue structure to support three DMA modes in a multi-channel DMA engine in accordance with selected embodiments of the present disclosure.

To provide additional details for an improved understanding of selected embodiments of the present disclosure, reference is now made to FIG. 3 which depicts a simplified flow chart 300 showing the logic for using a command queue structure to support three DMA modes in a multi-channel DMA engine in accordance selected embodiments of the present disclosure. In an example embodiment, the processing shown in FIG. 3 may be performed by a multi-channel direct memory access (MCDMA) hardware engine interface that is connected to receive DMA requests from one or more host processors and to execute direct memory access transfers between one or more memory and/or other peripheral interfaces in response to the DMA transfer request(s).

At step 301, the disclosed control logic and/or hardware at the MCDMA hardware engine are configured to receive and process a DMA transfer request associated with a pending virtual channel. As will be appreciated, DMA requests, interrupts, completion signals and other coordination indications or status are communicated between a processor and the MCDMA hardware engine via any suitable interconnection, shown collectively in FIG. 1 as interconnect(s) 13 between the processor(s) 12 and MCDMA engine 14.

Upon detecting that the DMA channel request is a "direct configuration" (mode 0) request (affirmative outcome to detection step 302), a first sequence of commands is processed at step 303 to directly configure the register-based descriptors stored in the DMA channel context registers. In the example architecture shown in FIG. 2, the DMA descriptor may be input from the APB interface 204 over the bypass signal line 205 to directly write DMA transfer details to the selected context register 232, during which time the selected context register is not enabled as a resource to the dispatcher 228.

If the DMA channel request is not a "direct configuration" (mode 0) request (negative outcome to detection step 302), the DMA channel request is processed at step 304 to determine if a "link list configuration" (a.k.a., mode 1) request has been received. If so (affirmative outcome to detection step 304), a second sequence of commands is written directly into the command queue structure to fetch a linked list descriptor chain from memory for loading into the context registers. In the example architecture shown in FIG. 2, a "link list configuration" is supported by using the APB interface 204 to directly write a sequence of commands into the associated CMDQ_FIFO (e.g., 224) for subsequent processing by the CMDQ arbiter/dispatch unit 228 to update the context store descriptors stored in the DMA channel context registers 232.

If the DMA channel request is not a "link list configuration" (mode 1) request (negative outcome to detection step 304), the DMA channel request is processed at step 306 to determine if a "program configuration" (a.k.a, mode 2) request has been received. If so (affirmative outcome to detection step 306), a third sequence of commands for configuring a DMA fetch of a memory mapped instruction sequence is loaded into one or more of the command queue structure registers for execution as an "instruction program" that can be repeatedly executed to perform a DMA fetch of the relevant instructions commands. In the example architecture shown in FIG. 2, the CMDQ DMA Controller 210 supports a "program configuration" request by using the pending virtual channel for the DMA transfer request to arbitrate for access to an available CMDQ_FIFO so that the association can be stored in the lookup table 216. Once the pending virtual channel is associated with a CMDQ_FIFO, the CMDQ DMA Controller 210 then arbitrates for access over the AXI port(s) 250 to fetch instruction program as data that is stored as a third sequence of instruction commands in one more CMDQ_FIFOs (e.g., 224-227) for subsequent processing by the CMDQ arbiter/dispatch unit 228. In support of the "program configuration" requests where the fetched instruction program/instruction commands can be stored within the CMDQ_FIFOs 222-227, the FIFO storage may be used as a cache memory, eliminating the need to re-fetch the instruction commands for multiple loops. Otherwise, instructions commands will need to be re-fetched for each loop. Through software configuration by the CMDQ DMA Controller 210, the CMDQ_FIFOs 222-227 may be enabled to be used as one large FIFO, merging the FIFO RAM memories into a single, large cache.

As disclosed herein, the instruction program/instruction commands may be stored in the CMDQ_FIFO(s) via an APB interface 204 or via a CMDQ DMA controller 210. However inserted, the instruction program/instruction commands may include a sequence of instructions, including a SEQ_CONF command (to synchronize a particular instruction set (SEQ_ID, etc.) with the sequencer via the interface 229 to allow synchronization of the data movement, that is about to begin, to be known to software and other hardware modules). In selected embodiments, the sequencer can be implemented as a hardware module, as defined in APEX, or a separate processor, such as an ARM CPU or other CPU-type processor. The sequence of instructions may also include instructions for configuring the context store 231 to describe the desired data movement. For example, a FETCH_SideBand command may be used to fetch peripheral sideband data, and a FETCH_LL command may be used to fetch LinkList data, for a virtual channel, in context. In addition, some instructions are used to fetch a desired sideband configuration of peripheral hardware modules before data is passed/fetched to/from it. For example, a CONF_SideBand command may be used to perform peripheral sideband configuration, for a virtual channel, in context, while a FETCH_DATA command may be used to fetch data, for a virtual channel, in context. The sequence of instructions may include additional instructions, such as a SET_AXI command (to configure AXI bus attributes (e.g., ACE-Lite+QoS), and an ALLOCATE_EXECUTE command (to allocate or deallocate resources, for individual virtual channels, in context). In various embodiments, an instruction can be a single cycle instruction (e.g., for updating a context store entry or triggering a sideband fetch) or a multiple cycle instruction (e.g., for allocating a resource, terminating an instruction set, waiting for a sequencer response, etc.).

And since each sequence of instructions stored in one or more CMDQ_FIFOs must have a context entry within the context store 231, the first command of an instruction set will be a "WAIT" command which signals the sequencer (via the interface 229) that a DMA transfer process is ready to start. When the sequencer signals the DMA transfer process to continue, the dispatcher 228, processing the CMDQ_FIFO's (e.g., 224) WAIT command, will dynamically allocate a context, based upon the virtual channel sequence identification (SEQ_ID). If a context already exists, that context will be reused. If no context is available, the dispatcher 228 will simply proceed to another CMDQ_FIFO (e.g., 225), and repeat the context allocation when the CMDQ_FIFO 224 is next arbitrated.

Prior to servicing a command queue entry, the dispatcher 228 must allocate or validate that a context to the virtual channel identification (SEQ_ID) is available or assigned. In cases where a single CMDQ_FIFO consumes multiple contexts, it is possible that some CMDQ_FIFOs cannot proceed due to inability to allocate a context store.

Finally, the last instruction in the sequence of instructions stored in one or more CMDQ_FIFOs may be a LAST command which is used to indicate an "end" on the fetched instruction set. This allows the dispatcher 228 to inform the CMDQDMA controller 210 to either terminate the Virtual Channel or repeat the virtual channel, if configured to do so. In response the LAST command, CMDQDMA controller 210 terminates the corresponding virtual channel that is connected to the CMDQ_FIFO and relinquishes the associated CMDQ_FIFO.

At step 308, the next non-active virtual DMA channel is selected for arbitration to get access to the CMNDQ_FIFO, and the process steps 303-307 are repeated as indicated by the feedback path.

Figure 4:
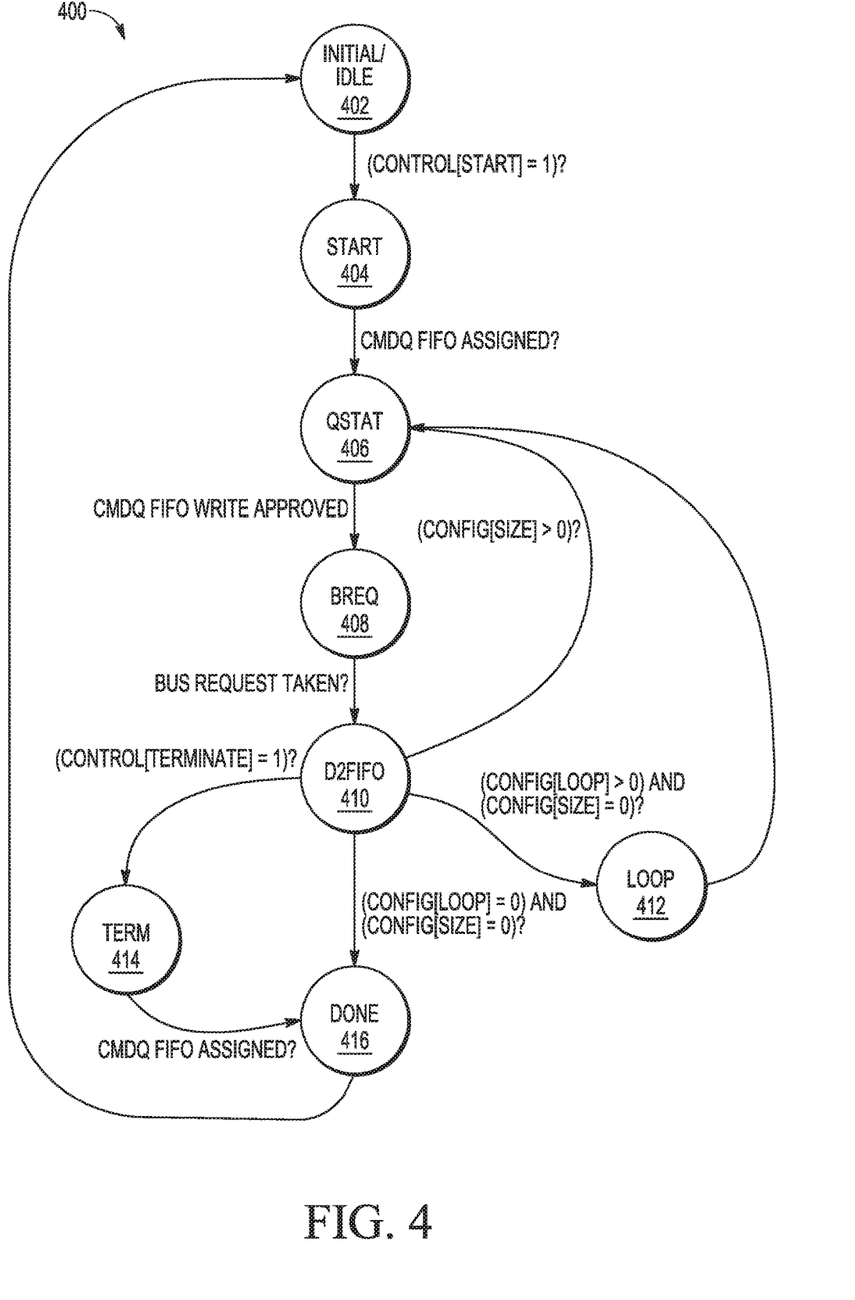
FIG. 4 schematically illustrates a simplified state diagram describing the operation of the CMDQUEUE DMA state machine mechanism in accordance with selected embodiments of the present disclosure.

To provide additional details for an improved understanding of selected embodiments of the present disclosure, reference is now made to FIG. 4 which schematically illustrates the operation for managing access to support DMA operations in the highest level DMA mode configuration (mode 2) over multiple DMA channels with respect to a state machine diagram 400 schematically illustrating the functional states and transitions between them. The illustrated diagram 400 includes eight states 402-416 having the indicated state transitions effected by status values stored in command DMA registers of the DMA controller to support the program configuration DMA mode (mode 2) by fetching the relevant instruction/commands. For example, the control and status registers 240 shown in FIG. 2 may include the following command DMA registers for supporting the command fetching DMA engine:

Command DMA Address N

There are a maximum of 128 Command DMA pointers to N instruction sets located in memory.

| Command DMA Address N Field Name | Bit Field | Description |
|---|---|---|
| ADDRESS | 31:0 | Base address to fetch command sequence |

Command DMA Config N

| Command DMA Config N Field Name | Bit Field | Description |
|---|---|---|
| SIZE | 7:0 | Number of 128-bit word size to transfer |
| LOOP | 15:8 | Initial count for number of times to repeat command sequence fetch. Count is decremented in context based on LAST command in instruction set. |
| Reserved | 31:16 | |

Command DMA Control N

| Command DMA Control N Field Name | Bit Field | Description |
|---|---|---|
| Reserved | 29:0 | |
| TERMINATE | 30 | Stop the DMA command fetching. The bit will self clear after any outstanding fetch is complete. |
| START | 31 | Start the DMA fetch of commands. The bit will self clear after fetch sequence is complete and loop count is 0. |

Command DMA Status N

| Command DMA Status N Field Name | Bit Field | Description |
|---|---|---|
| BUS | 0 | 1 = AXI bus request outstanding |
| ACTIVE | 1 | 1 = DMA is active for process N |
| STATE | 3:2 | Current state of command queue DMA engine: 00 = IDLE 01 = Command Queue Granted 10 = DMA fetching commands |
| ID | 7:4 | Command Queue Number Granted |
| Reserved | 31:8 | |

Referring again to the state machine diagram 400 shown in FIG. 4, the initial state is a non-operational idle state 402. Upon an initialization of a given virtual DMA channel, which may be for instance part of a rest procedure, the mechanism for supporting the program configuration DMA mode transitions into the operational START state 404. The operational transition may be detected when the DMA controller periodically checks to see if the START bit of the Command DMA Control N register is set (e.g., Control [START]=1).

In the operational START state 404, each virtual DMA channel will arbitrate to access the "available" CMDQ FIFOs in the command queue structure. To this end, the DMA controller may use round robin arbiter to associate a virtual DMA channel to a CMDQ FIFO.

Once a virtual DMA channel is assigned to a CMDQ FIFO, the operational state transitions to a command queue status check QSTAT state 406 to check whether there is available space in the assigned command queue structure. The operational transition to the QSTAT state 406 may be detected when the DMA controller updates the look-up table to assign the virtual DMA channel to a CMDQ FIFO. If the CMDQ FIFO is "full", no data is fetched.

Upon receiving approval to write to the CMDQ FIFO, the operational state transitions to a bus request state BREQ 408 where a bus read request targeting the command space (fetch instruction/commands) is issued to fetch command data via the bus interface. In an example embodiment, the bus request word size is 128 bit, and the length of transfer and beat size is dependent upon the amount of room in the target CMDQ FIFO. The operational transition to the BREQ state 408 may be detected when the command queue structure notifies the DMA controller that write operations to a CMDQ FIFO are approved. In selected embodiments, the DMA controller issues the bus request through AXI ports based upon address to fetch the data, i.e., the instruction set. At each AXI port, the AXI_ID is used to identify the routing of the data, i.e., who is requesting the data (e.g., the DMA controller) and which virtual channel. Thus, when rdata is returned, the associated AXI_ID will be decoded to steer the rdata to the respective requestor, i.e., virtual channel in the DMA controller which performs a lookup to determine the associated CMDQ FIFO where the data is to be written.

Once a bus request is taken, the operational state transitions to a FIFO data write state D2FIFO 410 wherein the bus return read data from memory is written into the targeted CMDQ FIFO in the command queue structure. In this way, an instruction set may be fetched as data from memory for storage in the CDMQ FIFOs. With a bus request word size (e.g., 128-bit), the instruction set should be a multiple of the bus width so that an instruction/command is 64-bit in size. With a bus ID width of 4, up to 16 CMDQFIFOs can be supported by the DMA controller which uses the bus ID to route returning data from the bus to the correct CMDQ FIFO. For example, there can be embodiments with 4 and 16 CMDQFIFOs, depending on the embodiment. If the number of instruction commands can be stored within the CMDQ FIFO, the FIFO(s) will thereafter be utilized as a cache, eliminating the need to re-fetch the CMDs for multiple loops. Otherwise, instruction commands will need to be re-fetched for each loop. To implement this arrangement, a software configuration of the command DMA registers can be used to enable all CMDQ FIFOs to be used as one large FIFO, merging the FIFO RAM memories to be used as one large cache.

For example, if the DMA controller detects that there are additional instruction commands to transfer, the operational state may transition to the command queue status check QSTAT state 406 to check if there is available space in the command queue structure. This operational transition may be detected when the DMA controller detects from the SIZE field stored in the Command DMA Config N register that there are one or more 128-bit words to transfer (e.g., Config [SIZE]>0).

However, if there are no additional instruction commands to transfer (e.g., Config [SIZE]=0), this indicates that the required instruction commands have all been written into the CMDQ FIFOs, at which point the operational state may transition to the LOOP state 412 which decrements the LOOP count and resets the SIZE field. This operational transition may be detected when the DMA controller detects from the LOOP field stored in the Command DMA Config N register that there are one or more additional command sequence fetch operations to perform (e.g., Config[LOOP] >0), at which point the LOOP state 412 decrements by 1 the initial count of the number of times to repeat command sequence fetch (e.g., LOOP=LOOP−1) and resets the SIZE field to the initial value. In this way, the LOOP count is decremented in context based on LAST command in instruction set. The processing through states 406-412 is repeated until the LOOP count is fully decremented (e.g., Config [LOOP]=0), at which point the operational state may transition to the DONE state 416.

Another transition path from the D2FIFO state 410 occurs when the TERMINATE control status bit is set in the Command DMA Control N register (e.g., Control[TERMINATE]=1), at which point the operational state may transition to the TERM state 414 where the DMA controller waits for the current transfer to complete. Upon detecting that the bus transfer is completed, the operational state may transition to the DONE state 416 where the DMA controller sends a "Done" Interrupt and clears the Control[START] bit in the Command DMA Control N register (e.g., Control[START]=0). With the Control[START] bit reset, the operational state may transition back to the IDLE state 402 to await the next DMA transfer request.

In example embodiments where the CMDQ FIFO is N deep×128 bit wide, it can hold an instruction set of N*2 instructions which can be looped with the state machine diagram 400 described hereinabove so that the content of the FIFO may be accessed as a cache memory so that instructions stored therein may be performed and retained in the CMDQ FIFO until the LOOP count stored in the Command DMA Config N register is decremented to 0. Only after the loop is completed is the entire cache (instructions that comprise the content of the loop and the loop instruction itself) POPPED at the DONE state 416, at which time the CMDQ FIFO informs the DMA controller that space is available for the DMA controller to fetch more instructions. By including a "terminate" instruction as the last instruction within the instruction set, the DMA controller is notified that the content of the CMDQ FIFO is finished, at which point the DMA controller may terminate the respective virtual channel (connected to the CMDQ FIFO) and relinquish the associated CMDQ FIFO, allowing the next non-active virtual channel to arbitrate for access to the CMDQ FIFO.

As disclosed herein, the multi-channel, multi-mode DMA method, system, and apparatus may be implemented as a hardware interface between one or more host processor(s), peripheral(s), and memory module(s) with operative functionality embodied in a DMA controller, command queue structure, and dispatcher that are connected and controlled by control logic and/or computer program product having program code portions for performing steps of a method and/or for performing functions of a device or system for enabling multi-channel DMA transfers to occur simultaneously in three different modes by virtue of storing DMA command sequences in the command queue structure. As used herein, a "processor" or "controller" refers to any microprocessor (MPU), microcontroller (MCU), digital signal processor (DSP), a digital signal controller (DSC), or System-on-Chip (SoC) for running a computer software program. Although embodiments are described in the context of supporting three types of DMA transfer operations, the proposed multi-channel, multi-mode DMA method, system, and apparatus may be implemented in a wide range of applications. In addition, a "program" refers to a sequence of instructions designed for execution on a computer system, and may include a subroutine, a function, a procedure, an object method, an object implementation, an executable application, an applet, a servlet, a source code, an object code, a shared library/dynamic load library and/or other sequence of instructions designed for execution on a computer system. The computer program may be provided on a data carrier, such as a DVD, flash drive. CD-ROM or diskette, stored with data loadable in a memory of a computer system, the data representing the computer program. The data carrier may further be a data connection, such as a telephone line, cable or other wired or wireless connection. In addition or in the alternative, all or some of the software described herein may be stored on or retrieved from computer readable media, such as memory or other storage media which may be permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

Some of the above embodiments, as applicable, may be implemented using a variety of different data processing systems. For example, although FIG. 2 and the discussion thereof describe an exemplary data processing architecture of a multi-channel direct memory access hardware engine, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architecture depicted herein is merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality. Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

By now it should be appreciated that there has been provided an apparatus, method, program code, and system for managing a plurality of DMA channels in a plurality of different DMA modes. In the disclosed apparatus, method, program code, and system, a multi-channel DMA engine (or separate processor) processes a first sequence of commands associated with a first virtual DMA channel to directly configure one or more first register descriptors at a context store to implement a direct configuration DMA mode for the first virtual channel. In selected embodiments, the first sequence of commands is processed by using a bus interface in the multi-channel DMA engine to directly write the one or more first register descriptors at the context store. The multi-channel DMA engine also processes a second sequence of commands associated with a second virtual DMA channel for storage in a second FIFO register of the command queue structure (or an external command queue structure) to initiate a fetch of a linked list descriptor chain for loading one or more second register descriptors at a second DMA channel context store register to implement a link list configuration DMA mode for the second virtual channel. In selected embodiments, the second sequence of commands is processed by using a bus interface in the multi-channel DMA engine to directly store the second sequence of commands at a FIFO register of the command queue structure that is associated with the second virtual DMA channel at the multi-channel DMA engine. In addition, the multi-channel DMA engine processes a third sequence of commands associated with a third virtual DMA channel for storage in a third FIFO register of the command queue structure to retrieve an instruction program for loading into the command queue structure and execution by the multi-channel DMA engine to implement a program configuration DMA mode for the third virtual channel. In selected embodiments, the third sequence of commands is processed by using a DMA controller in the multi-channel DMA engine to store the third first sequence of commands at a FIFO register of the command queue structure that is associated with the third virtual DMA channel at the multi-channel DMA engine. In selected embodiments, the first, second, and third virtual DMA channels can be managed simultaneously at the multi-channel DMA engine to operate, respectively, in the direct configuration DMA mode, the link list configuration DMA mode, and the program configuration DMA mode. In addition, each of the first, second, and third virtual DMA channels may be dynamically assigned, respectively, to first, second, and third command FIFO registers in the command queue structure. In addition, each of the first, second, and third command FIFO registers may be dynamically assigned, respectively, to first, second, and third first DMA channel context store registers in the context store.

In another form, there is provided an apparatus and associated method, program code, and system for managing DMA channels in different DMA modes. In the disclosed apparatus, a context store is provided for storing data structures to assist with processing of a plurality of active DMA channels. The disclosed apparatus also includes a plurality of command queue FIFO memories that store command sequences associated with one or more virtual DMA channels and that are connected across an arbiter and dispatcher circuit to the context store. In addition, the disclosed apparatus includes a bus interface suitably coupled to the context store and the plurality of command queue FIFO memories. Finally, the apparatus includes a DMA controller suitably coupled to the context store, plurality of command queue FIFO memories, and the bus interface, the DMA controller comprising a plurality of virtual DMA channel registers for supporting a plurality of virtual DMA channels, an arbiter, and a lookup table for associating one or more of the plurality of virtual DMA channels with one or more of the plurality of command queue FIFO memories. In operation, the apparatus processes a first sequence of commands associated with a first virtual DMA channel to directly configure one or more first register descriptors at the context store to implement a direct configuration DMA mode for the first virtual channel, such as by using the bus interface to directly write the one or more first register descriptors at the context store to implement the direct configuration DMA mode for the first virtual channel. In addition, the apparatus processes a second sequence of commands associated with a second virtual DMA channel for storage in the plurality of command queue FIFO memories to initiate a fetch of a linked list descriptor chain for loading one or more second register descriptors at a second DMA channel context store register to implement a link list configuration DMA mode for the second virtual channel, such as by using the bus interface to directly store the second sequence of commands at one or more of the plurality of FIFO memories that is associated with the second virtual DMA channel. Finally, the apparatus processes a third sequence of commands associated with a third virtual DMA channel for storage in the plurality of command queue FIFO memories to retrieve an instruction program that is loaded into the plurality of command queue FIFO memories and executed by the apparatus to implement a program configuration DMA mode for the third virtual channel, such as by using the DMA controller to store the third first sequence of commands at one or more of the plurality of FIFO memories that is associated with the third virtual DMA channel. In selected embodiments, the apparatus is configured to simultaneously manage the first, second, and third virtual DMA channels to operate, respectively, in the direct configuration DMA mode, the link list configuration DMA mode, and the program configuration DMA mode. In addition, the DMA controller may be configured to dynamically assign each of the first, second, and third virtual DMA channels, respectively, to first, second, and third FIFO memories in the plurality of FIFO memories. For example, the arbiter and dispatcher circuit may be configured to dynamically assign each of the first, second, and third FIFO memories, respectively, to first, second, and third first DMA channel context store registers in the context store.

In yet another form, there is provided an electronic device and associated method, program code, and system for managing DMA channels in different DMA modes. In the disclosed electronic device, a processor and memory are connected for access to an interconnect. In addition, the electronic device includes a multi-channel DMA interface coupled to the interconnect and comprising a command queue FIFO memory for storing command sequences to support simultaneous management of a plurality of direct memory access (DMA) channels in a plurality of different DMA modes comprising a direct configuration DMA mode, a link list configuration DMA mode, and a program configuration DMA mode. In selected embodiments, the multi-channel DMA interface includes a context store for storing data structures to assist with processing of a plurality of active DMA channels; a bus interface suitably coupled to the context store and the command queue FIFO memory; and a DMA controller suitably coupled to the context store, command queue FIFO memory, and the bus interface, the DMA controller comprising a plurality of virtual DMA channel registers for supporting a plurality of virtual DMA channels, an arbiter, and a lookup table for associating one or more of the plurality of virtual DMA channels with one or more FIFO registers in the command queue FIFO memory. In operation, the multi-channel DMA interface may be configured to process a first sequence of commands associated with a first virtual DMA channel to directly configure one or more first register descriptors at the context store to implement a direct configuration DMA mode for the first virtual channel. In addition, the multi-channel DMA interface may be configured to process a second sequence of commands associated with a second virtual DMA channel for storage in the command queue FIFO memory to initiate a fetch of a linked list descriptor chain for loading one or more second register descriptors at a second DMA channel context store register to implement a link list configuration DMA mode for the second virtual channel. Finally, the multi-channel DMA interface may be configured to process a third sequence of commands associated with a third virtual DMA channel for storage in the command queue FIFO memory to retrieve an instruction program that is loaded into the command queue FIFO memory for execution to implement a program configuration DMA mode for the third virtual channel. In addition, the multi-channel DMA interface may be configured to dynamically assign each of the first, second, and third virtual DMA channels, respectively, to first, second, and third FIFO memories in the command queue FIFO memory. Finally, the multi-channel DMA interface may be configured to dynamically assign each of the first, second, and third FIFO memories, respectively, to first, second, and third first DMA channel context store registers in the context store.

Various illustrative embodiments of the present invention have been described in detail with reference to the accompanying figures. While various details are set forth in the foregoing description, it will be appreciated that the present invention may be practiced without these specific details, and that numerous implementation-specific decisions may be made to the invention described herein to achieve the circuit designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art. Although the described exemplary embodiments disclosed herein are directed to an exemplary multi-channel direct memory access hardware engine, the present invention is not necessarily limited to the example embodiments illustrate herein, and various embodiments of the circuitry and methods disclosed herein may be implemented with other devices and software components. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for managing a plurality of direct memory access (DMA) channels in a plurality of different DMA modes, the method comprising:
processing a first sequence of commands associated with a first virtual DMA channel at a multi-channel DMA engine to directly configure one or more first register descriptors at a context store to implement a direct configuration DMA mode for the first virtual channel;
processing a second sequence of commands associated with a second virtual DMA channel at the multi-channel DMA engine for storage in the command queue structure to initiate a fetch of a linked list descriptor chain for loading one or more second register descriptors at a second DMA channel context store register to implement a link list configuration DMA mode for the second virtual channel; and
processing a third sequence of commands associated with a third virtual DMA channel at the multi-channel DMA engine for storage in the command queue structure to retrieve an instruction program for loading into the command queue structure and execution by the multi-channel DMA engine to implement a program configuration DMA mode for the third virtual channel.

2. The method of claim 1, where processing the first sequence of commands comprises using a bus interface in the multi-channel DMA engine to directly write the one or more first register descriptors at the context store.

3. The method of claim 1, where processing the second sequence of commands comprises using a bus interface in the multi-channel DMA engine to directly store the second sequence of commands at a FIFO register of the command queue structure that is associated with the second virtual DMA channel at the multi-channel DMA engine.

4. The method of claim 1, where processing the third sequence of commands comprises using a DMA controller in the multi-channel DMA engine to store the third first sequence of commands at a FIFO register of the command queue structure that is associated with the third virtual DMA channel at the multi-channel DMA engine.

5. The method of claim 1, where the first, second, and third virtual DMA channels can be managed simultaneously at the multi-channel DMA engine to operate, respectively, in the direct configuration DMA mode, the link list configuration DMA mode, and the program configuration DMA mode.

6. The method of claim 1, further comprising dynamically assigning each of the first, second, and third virtual DMA channels, respectively, to first, second, and third command FIFO registers in the command queue structure.

7. The method of claim 6, further comprising dynamically assigning each of the first, second, and third command FIFO registers, respectively, to first, second, and third first DMA channel context store registers in the context store.

8. An apparatus comprising:
a context store for storing data structures to assist with processing of a plurality of active Direct Memory Access (DMA) channels;
a plurality of command queue FIFO memories that store command sequences associated with one or more virtual DMA channels and that are connected across an arbiter and dispatcher circuit to the context store;
a bus interface suitably coupled to the context store and the plurality of command queue FIFO memories; and
a DMA controller suitably coupled to the context store, plurality of command queue FIFO memories, and the bus interface, the DMA controller comprising a plurality of virtual DMA channel registers for supporting a plurality of virtual DMA channels, an arbiter, and a lookup table for associating one or more of the plurality of virtual DMA channels with one or more of the plurality of command queue FIFO memories.

9. The apparatus of claim 8,
where the apparatus processes a first sequence of commands associated with a first virtual DMA channel to directly configure one or more first register descriptors at the context store to implement a direct configuration DMA mode for the first virtual channel,
where the apparatus processes a second sequence of commands associated with a second virtual DMA channel for storage in the plurality of command queue FIFO memories to initiate a fetch of a linked list descriptor chain for loading one or more second register descriptors at a second DMA channel context store register to implement a link list configuration DMA mode for the second virtual channel; and
where the apparatus processes a third sequence of commands associated with a third virtual DMA channel for storage in the plurality of command queue FIFO memories to retrieve an instruction program that is loaded into the plurality of command queue FIFO memories and executed by the apparatus to implement a program configuration DMA mode for the third virtual channel.

10. The apparatus of claim 9, where the apparatus is configured to process the first sequence of commands using the bus interface to directly write the one or more first register descriptors at the context store to implement the direct configuration DMA mode for the first virtual channel.

11. The apparatus of claim 9, where the apparatus is configured to process the second sequence of commands using the bus interface to directly store the second sequence of commands at one or more of the plurality of FIFO memories that is associated with the second virtual DMA channel.

12. The apparatus of claim 9, where the apparatus is configured to process the third sequence of commands using the DMA controller to store the third first sequence of commands at one or more of the plurality of FIFO memories that is associated with the third virtual DMA channel.

13. The apparatus of claim 9, where the apparatus is configured to simultaneously manage the first, second, and third virtual DMA channels to operate, respectively, in the direct configuration DMA mode, the link list configuration DMA mode, and the program configuration DMA mode.

14. The apparatus of claim 8, where the DMA controller is configured to dynamically assign each of the first, second, and third virtual DMA channels, respectively, to first, second, and third FIFO memories in the plurality of FIFO memories.

15. The apparatus of claim 14, where the arbiter and dispatcher circuit is configured to dynamically assign each of the first, second, and third FIFO memories, respectively, to first, second, and third first DMA channel context store registers in the context store.

16. An electronic device comprising:
a processor and memory connected for access to an interconnect;

a multi-channel direct memory access (DMA) interface coupled to the interconnect and comprising a command queue FIFO memory for storing command sequences to support simultaneous management of a plurality of direct memory access (DMA) channels in a plurality of different DMA modes comprising a direct configuration DMA mode, a link list configuration DMA mode, and a program configuration DMA mode;

a context store for storing data structures to assist with processing of a plurality of active DMA channels;

a bus interface suitably coupled to the context store and the command queue FIFO memory; and a DMA controller suitably coupled to the context store, command queue FIFO memory, and the bus interface, the DMA controller comprising a plurality of virtual DMA channel registers for supporting a plurality of virtual DMA channels, an arbiter, and a lookup table for associating one or more of the plurality of virtual DMA channels with one or more FIFO registers in the command queue FIFO memory.

17. The electronic device of claim 16, where the multi-channel DMA interface is configured to process a first sequence of commands associated with a first virtual DMA channel to directly configure one or more first register descriptors at the context store to implement a direct configuration DMA mode for the first virtual channel, where the multi-channel DMA interface is configured to process a second sequence of commands associated with a second virtual DMA channel for storage in the command queue FIFO memory to initiate a fetch of a linked list descriptor chain for loading one or more second register descriptors at a second DMA channel context store register to implement a link list configuration DMA mode for the second virtual channel; and where the multi-channel DMA interface is configured to process a third sequence of commands associated with a third virtual DMA channel for storage in the command queue FIFO memory to retrieve an instruction program that is loaded into the command queue FIFO memory for execution to implement a program configuration DMA mode for the third virtual channel.

18. The electronic device of claim 16, where the multi-channel DMA interface is configured to dynamically assign each of the first, second, and third virtual DMA channels, respectively, to first, second, and third FIFO memories in the command queue FIFO memory.

19. The electronic device of claim 18, where the multi-channel DMA interface is configured to dynamically assign each of the first, second, and third FIFO memories, respectively, to first, second, and third first DMA channel context store registers in the context store.

* * * * *